J. Goulding.
BEST AVAILABLE COPY
Hackling Machine.
Patented Oct. 10, 1835.
9,151 X
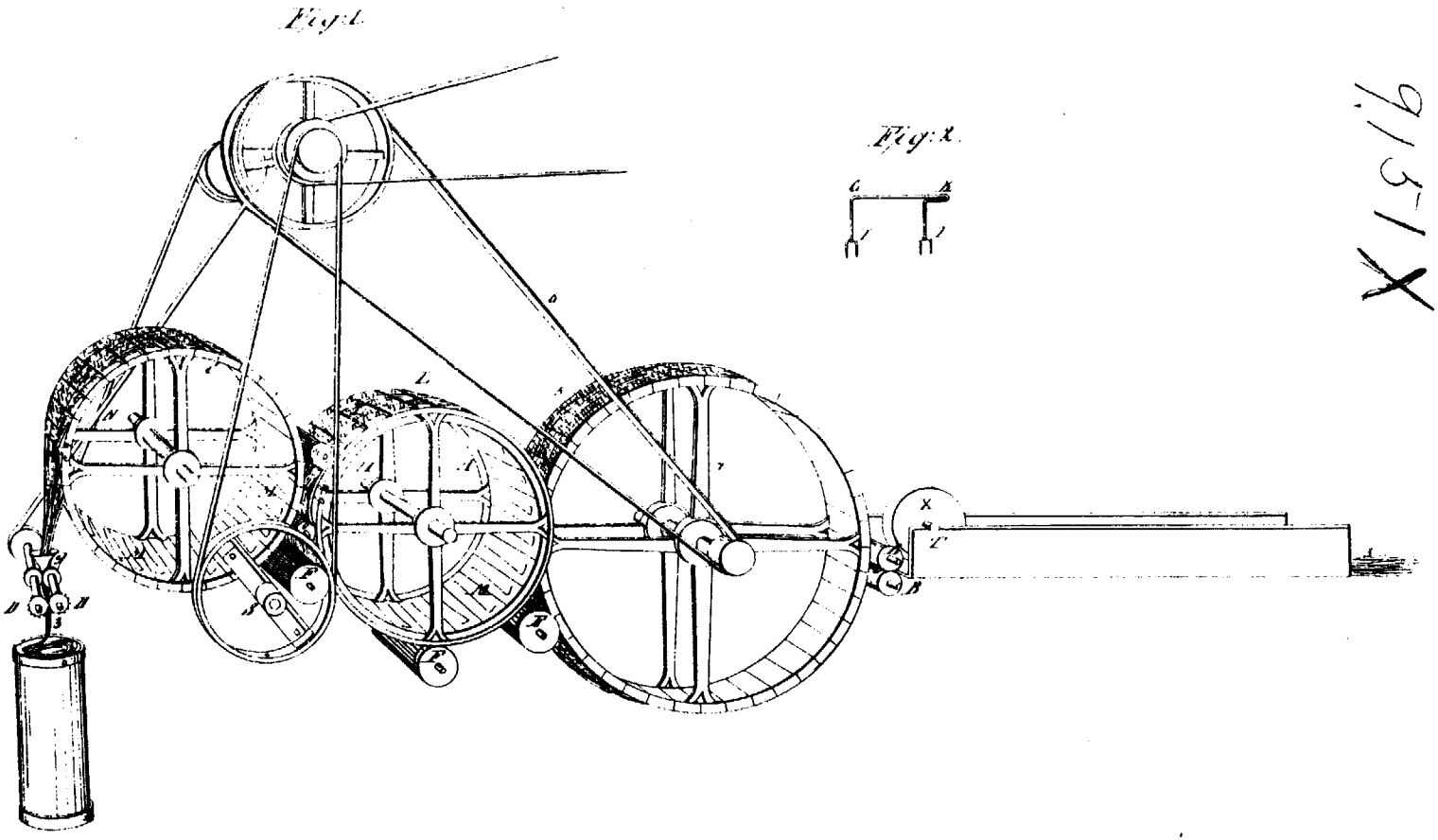
N. PETERS, PHOTO-LITHOGRAPHER, WASHINGTON, D. C.

John Goulding, of Boston, Mss:
Letters Patent

The schedule referred to in these Letters Patent and making part of the same containing a description in the words of the said John Goulding himself of his improvement in the machine for preparing & hatchelling hemp, flax, tow or manilla grass and producing a continuous stran.

---

To all to whom these presents shall come: Be it known that I, John Goulding of Boston in the County of Suffolk & Commonwealth of Massachusetts machinist have invented a new & useful improvement for hatchelling & preparing tow or other fibrous material of a short staple & producing therefrom a continuous stran or sliver, and that the following is a full and exact description of the construction & operation of said machine as improved by me.

Fig. 1 in the drawings hereto annexed represents a breaker for preparing & hatchelling tow or other fibrous material of a short staple from which yarn is to be spun; T is the trough into which the tow is laid, X is the roller under which it passes. B.B. are rollers between which it passes to be received by the first or receiving cylinder 4. This cylinder has strong iron or steel teeth or pins projecting at right angles from its outer surface about one half of an inch which may be put thro' wood or set in iron or other metal. These pins are set in rows nearly across & all around the cylinder, the pins equidistant & in quincunx order, so the the pins in each row shall be neither exactly behind those on the preceeding row nor exactly before them in the succeeding row. They are represented at 5. where this cylinder receives the tow from the rollers B.B. these pins strike upwards as it revolves, cylinder 4 is enclosed in an entire cover or case on the sides & all round its surface, except where it receives the tow from the rollers B.B. & also on the side opposite where it throws off the tow as hereafter described.

In its revolutions it moves close to cylinder A. but without touching it — 6. is the band which carries it. Cylinder 4 need not have more than one third as many teeth as it has. It is narrower than cylinder A but about two inches wider than the teeth in that cylinder; A represents another

9151X cylinder moving close to 4. It has iron or steel teeth or pins L L. projecting
about three fourths of an inch from its outer surface they are slightly incli-
ned, from a right angle pointing upwards when this cylinder comes nearest to
cylinder 4. The angle should be about ten degrees from a perpendicular to the
surface - these may be set in wood or iron or other metal. The cylinder is twelve
inches wide. of this the teeth should occupy about six inches - They are set in
rows across the surface & in the order before described with regard to the teeth
on cylinder 4. The cylinder A. is twelve inches in diameter: it has forty-eight
rows of teeth with eleven in a row F F F. are reels with wires or rods running from
head to head & fixed therein G G. are wires hung or fastened, to the edges or rim
of cylinder A. by staples I. I. (as seen in fig. 2) or by a joint. and screw --
These wires go across & upon the outward surface of the cylinder, & between the
rows of teeth or pins L L. K. is a piece of iron or metal fixed upon the frame
over which the wires pass as the cylinder revolves. M. M. are springs fastened
upon the inside of said cylinder & attached thro. the surface of the cylinder
by a stirrup to the wires G G. so as to bring them back to their places on the
outer surface of the cylinder after they have been raised by passing over K.
C represents a third cylinder. This has teeth projecting from the surface about
three eighths of an inch & set as before described, except that their inclination
from the perpendicular should not be more than five or six degrees, because if
greater than that the tow might remain on them & be carried round instead
of coming off, into the tube or tunnel q. This cylinder is twelve inches in
diameter, the same in width, has forty-eight rows of teeth eighteen in a row,
which occupy about six inches of the surface. C has wires corresponding to
G G. and springs corresponding to M. M. and a piece of iron or metal N. cor-
responding to K. on cylinder A - q. is a tunnel thro which the sliver passes as
it comes from the cylinder D D. are rollers which convey the sliver into a can
E. R is a band that goes round the pully or shaft S & carries cylinders A.
& C - S is a shaft having a gear on the other end that gears into cylinder
C - A & C may be geared together so as to give them the relative motion
required - The cylinder 4 revolves from fifty to sixty times while A goes
round once & C revolves about twelve times while A goes round once -
The manner of using this machine is as follows the tow is weighed out in

9151 X handfulls or parcels of about six ounces each & layed into the trough I. on a revolving apron each parcel occupying about eighteen inches, passing from this trough, the tow goes under roller X, between the rollers B.B. and is received by & passes over the cylinder 4. as the whole upper half circle of this cylinder is covered except at place at B B & also on the opposite side the tow is kept upon the cylinder until it has performed half a revolution. When it comes to the opening near the surface of cylinder A the centrifugal of cylinder 4, throws it off & it is lodged upon the projecting teeth in A. It then passes comparatively slow the under side of cylinder A. until it comes opposite to C. being in the first place prest in among the teeth of A. by the reels F.F. & then lifted off from the cylinder by means of the wires G.G. & the piece of metal H. which raises them, as the tow is raised in this manner from the surface of A. the teeth on cylinder C. take it off and carry it round on the upper side of that cylinder. The reel O presses it down among the teeth on cylin. C. as the reels F.F.F. had done before on cylinder A. As the wires G.G. reach the piece of metal N. they are raised by & pass over it, and disengage the sliver or roving so that it may be more easily drawn through the tunnel g. by the callender rollers D.D. It is then delivered into the can E. on both cylinders A & C. as the wires G.G. pass over H & N. they are drawn back to their places by the springs M.M. on the inside of the cylinder —.
After the tow has gone thro. one operation as above described it may be further broken or hatchelled on cylinders & in a machine precisely like the one above described excepting the trough & the cylinder 4. any number of the cans E filled with the sliver or roving may be set before rollers B.B. pass between them on to the cylinder A. & be carried thro as above described. For the first process of breaking or hatchelling as above described, cylinders 4 & A. may be used together without cylinder C. Having heretofore as stated in my petition, obtained Letters Patent for an improvement. In the mode of preparing, and hatchelling hemp flax, tow or Manilla grass & producing thereby a continuous stran or sliver, and all the parts of the above described machine with the exception of cylinder 4. (as above described) being constructed substantially upon the same principle with the machine patented as aforesaid. I herein claim Letters 236. 9151X Patent only for an improvement in the mode of hatchelling or preparing tow or other fibrous material of a short staple so as to produce therefrom a continuous strand or sliver by means of the cylinder 4. as above described —

Witnesses
Isaac Theyer
Horace Mann

John Goulding

Exd
W.H.

(Drawing)

[1600 w.d.